73172
Edwin Doolittle's Cultivator:
Fig: 1.
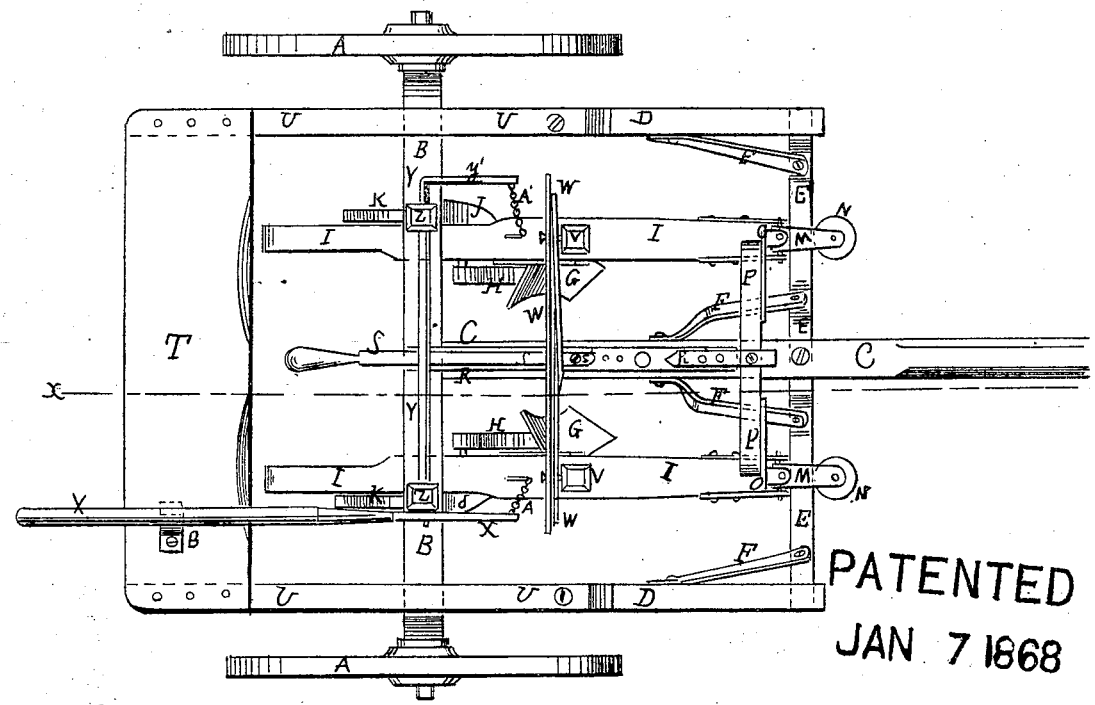
PATENTED JAN 7 1868
Witnesses:
Theo Insche
W. Trewin
Inventor
E. Doolittle
Per Murphy
Attorneys
Fig: 2.
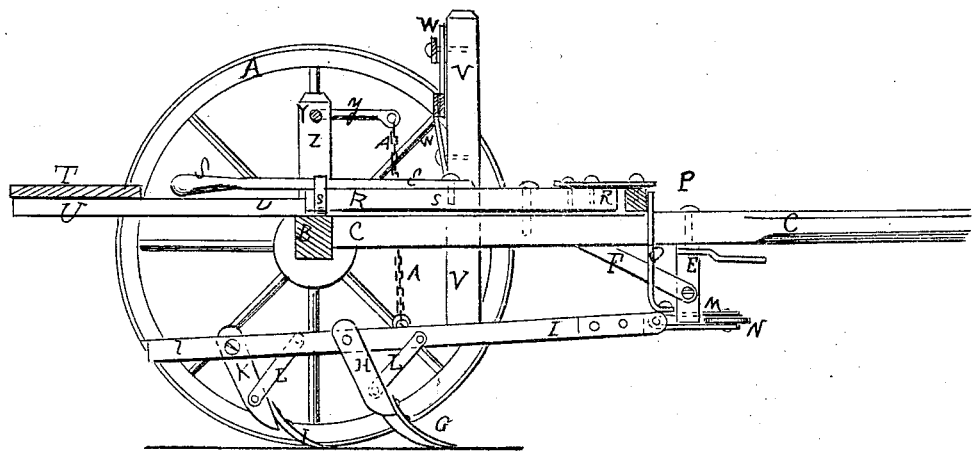

United States Patent Office.

EDWIN DOOLITTLE, OF PAWNEE, ILLINOIS.

Letters Patent No. 73,172, dated January 7, 1868.

IMPROVEMENT IN CULTIVATORS.

*The Schedule referred to in these Letters Patent and making part of the same.*

TO ALL WHOM IT MAY CONCERN:

Be it known that I, EDWIN DOOLITTLE, of Pawnee, in the county of Sangamon, and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a top view of my improved cultivator.

Figure 2 is a vertical longitudinal section of the same, taken through the line $x\,x$, fig. 1.

Similar letters of reference indicate corresponding parts.

My invention has for its object to furnish an improved cultivator, simple in construction, effective in operation, and which may be easily and conveniently guided when at work; and it consists in the construction and combination of parts by which the forward ends of the beams are connected to the cultivator-frame; in the combination of parts by which the driver is enabled to move the forward ends of the plough-beams to the right or left; in the construction and arrangement of the connecting and brace-bars with the uprights attached to the beams; in the combination of the adjustable-seat bars with the cultivator-frame; and in the combination of an adjustable handle with the guiding-lever; the whole being constructed and arranged as hereinafter more fully described.

A are the wheels, and B is the axle to which the other parts of the machine are attached, and by which they are supported. C is the tongue, the rear end of which is securely attached to the middle part of the axle B. D are two beams, the rear ends of which are securely attached to the forward side of the axle B, near its ends, and the forward ends of which are supported and connected to the tongue C by the strap or bar E. The ends of bar or strap E are securely attached to the forward ends of the beams or bars D. They are then bent at right angles, and descend vertically for about ten inches. At this point they are again bent at right angles, and pass inward horizontally till they approach the tongue C when they are bent at right angles and pass up to the level of the said tongue, and at the distance of two or three inches from its sides they are again bent at right angles, and the middle part of the said bar is securely attached to the under side of the said tongue C, thus leaving a space for the passage of the plants without danger of being broken. The connection between the bar E and the tongue C and beams D is strengthened by the braces F, as shown in figs. 1 and 2. G are the inner or mould-board ploughs, the standards H of which are attached to the inner sides of the plough-beams I, and which may be shifted or adjusted according as it is desired to throw the dirt towards or from the plants. J are the outer or shovel-ploughs, the standards K of which are attached to the outer sides of the beams I. The standards H and K are strengthened by the braces L connecting them to the beams I, as shown in fig. 2. To the forward ends of the beams I are hinged slides M, which slide back and forth along the horizontal parts of the strap or bar E, and which have friction-wheels or rollers N pivoted in their forward ends, the faces of which rest against the forward edge of the said strap or bar, enabling the forward ends of the beams I to be easily moved to the right or left, even when the ploughs are working. To the hinged slides M are attached the lower ends of the bars or knees O, the upper ends of which are attached to the ends of the cross-bar P, which rests upon the upper side of the tongue C, and to the centre of which is pivoted the forward end of the lever R. The lever R is pivoted to the upper side of the tongue, about twelve inches from the cross-bar P, and to its rear end is adjustably attached a handle, S, by a slide or keeper, $S^1$, and a bolt, $S^2$, so that said handle may be so adjusted as to be at a convenient distance from the seat T, whatever position said seat may have. T is the seat, the ends of which are securely attached to the rear ends of the bars U, the forward ends of which are adjustably bolted to the beams or bars D, so that the seat T may be moved forward or back, as the driver is heavy or light, to balance the forward part of the machine, and prevent it from bearing too heavily upon the necks of the horses. To the middle parts of the beams I are attached the lower ends of the uprights V, the upper ends of which are adjustably connected and held at any desired distance apart by the three bars W, the upper one of which is horizontal, and the other two inclined, crossing each other, as shown in fig. 2, so as to hold the said upright steadily in position. Several holes are made through the ends of the brace-bars W for the passage of the bolts, by which they are secured to the uprights V, so that the said uprights may be conveniently adjusted to hold the plough-beams I at any desired distance apart while working. X is a lever rigidly attached to the end of the pivoting-bar Y, which works in the bearings in the supports Z attached to the axle B. A' are chains, the upper ends of which are attached to the lower end of the lever X, and to the lower downwardly-projecting end $y'$ of the pivoting-rod Y, and the lower ends of which are attached to the plough-beams I, so that, by operating the lever X, the ploughs may be lifted away from the ground, when desired. B' is a hook attached to the seat-board, so that by hooking the lever X upon it the ploughs may be held suspended free from the ground.

Having thus described my invention, what I claim as new, and desire to secure by Letters Patent, is—

1. The hinged slides M, friction-wheels N, and bent bar E, with each other and with the plough-beams I, and with the beams or bars D, substantially as herein shown and described, and for the purpose set forth.

2. In combination with the above, the knees or bars O, cross-bar P, and lever R, all arranged and operating in the manner and for the purpose set forth.

3. The combination of the adjustable connecting and brace-bars W, uprights V, and plough-beams I, when arranged to operate in the manner herein described and represented.

EDWIN DOOLITTLE.

Witnesses:
  GARRED YOUNG,
  MARSHALL M. GOODE.